(12) United States Patent
Fox

(10) Patent No.: US 8,935,993 B2
(45) Date of Patent: Jan. 20, 2015

(54) PET LEASH WITH RETRIEVAL TOY

(71) Applicant: Jacklyn Fox, Sioux City, IA (US)

(72) Inventor: Jacklyn Fox, Sioux City, IA (US)

( * ) Notice: Subject to any disclaimer, the term of this patent is extended or adjusted under 35 U.S.C. 154(b) by 8 days.

(21) Appl. No.: 13/912,526

(22) Filed: Jun. 7, 2013

(65) Prior Publication Data

US 2014/0360440 A1 Dec. 11, 2014

(51) Int. Cl.
*A01K 27/00* (2006.01)
(52) U.S. Cl.
CPC .............. *A01K 27/008* (2013.01); *A01K 27/004* (2013.01)
USPC ......................................................... 119/796
(58) Field of Classification Search
USPC ........................ 119/796, 858, 795, 797, 798
See application file for complete search history.

(56) References Cited

U.S. PATENT DOCUMENTS

| 5,401,034 | A | 3/1995 | Mallinger |
| 5,441,017 | A | 8/1995 | Lindsay |
| D393,504 | S | 4/1998 | Eisman |
| 5,890,456 | A * | 4/1999 | Tancrede ....................... 119/794 |
| 6,024,054 | A | 2/2000 | Matt et al. |
| 6,085,695 | A | 7/2000 | Miller et al. |
| 6,314,917 | B1 * | 11/2001 | Ryan .............................. 119/796 |
| 6,845,737 | B1 * | 1/2005 | Austin ........................... 119/796 |
| 7,044,080 | B2 | 5/2006 | Rabello |
| D610,315 | S | 2/2010 | Lopusnak et al. |
| D613,002 | S | 3/2010 | Lopusnak et al. |
| 7,789,042 | B1 | 9/2010 | Dinon |
| 8,256,379 | B2 * | 9/2012 | Rabello ...................... 119/61.56 |
| 8,256,384 | B2 * | 9/2012 | Wheeler et al. ............... 119/795 |
| 8,336,505 | B2 | 12/2012 | Lopusnak et al. |
| 8,720,385 | B2 * | 5/2014 | Tanner .......................... 119/796 |
| 8,739,740 | B2 * | 6/2014 | Goldy et al. .................. 119/796 |
| 2008/0072886 | A1 * | 3/2008 | Cattlin .............................. 124/5 |
| 2008/0105214 | A1 | 5/2008 | Moulton |
| 2010/0043721 | A1 * | 2/2010 | Cigan ........................... 119/796 |
| 2010/0326371 | A1 | 12/2010 | Lopusnak et al. |
| 2011/0197820 | A1 * | 8/2011 | Goldy et al. ................. 119/61.5 |
| 2012/0035007 | A1 | 2/2012 | Sanna |
| 2013/0098308 | A1 * | 4/2013 | Tanner ........................... 119/707 |

* cited by examiner

*Primary Examiner* — Kristen C Hayes
(74) *Attorney, Agent, or Firm* — Kinney & Lange, P.A.

(57) ABSTRACT

A retracting lead assembly including a casing with an interior surface and an exterior surface and a proximal end and a distal end, the casing having an open space at a center of the distal end; a reel mounted within the casing, the reel having a lead that is on the interior of the casing wrapped at least partially around the reel, the lead having a first end and a second end, the first end attached to the reel, the second end constructed and arranged to attach to an animal; and a handle attached to the exterior surface of the proximal end of the casing.

19 Claims, 6 Drawing Sheets

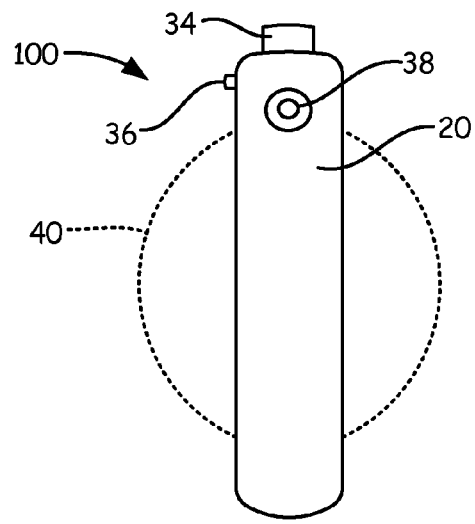
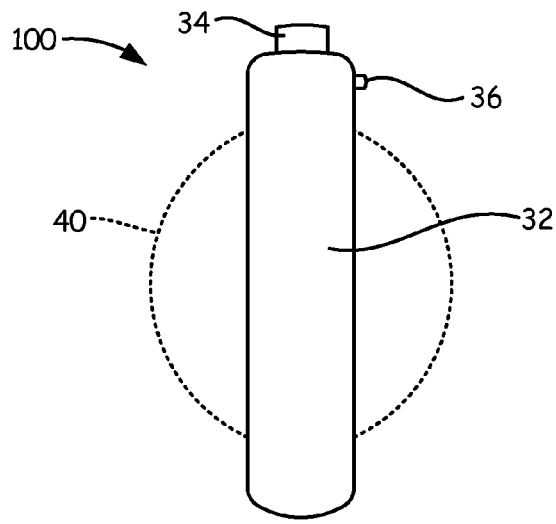
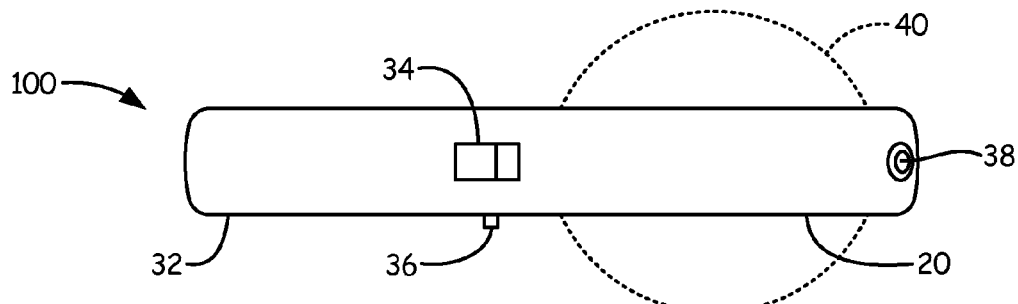
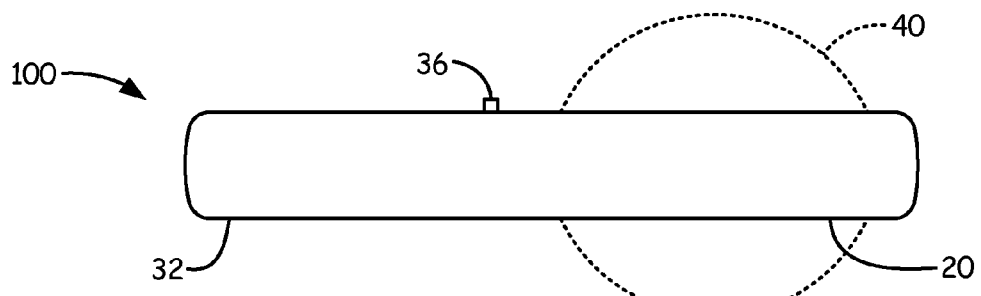

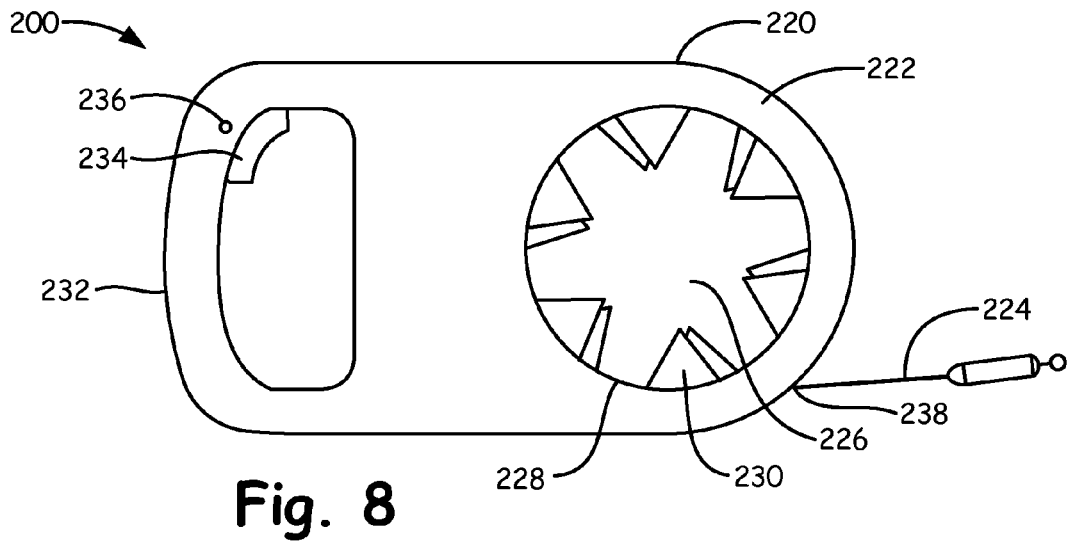
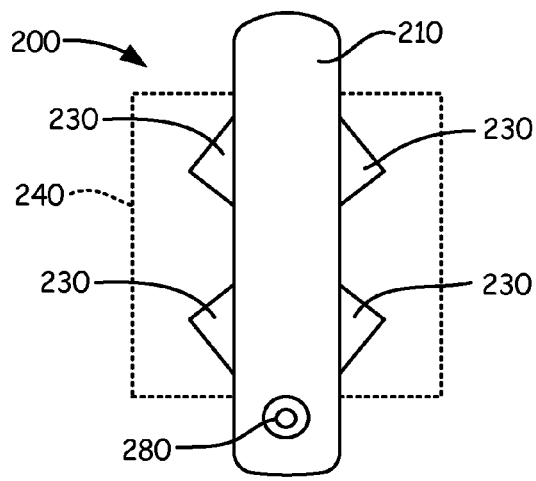 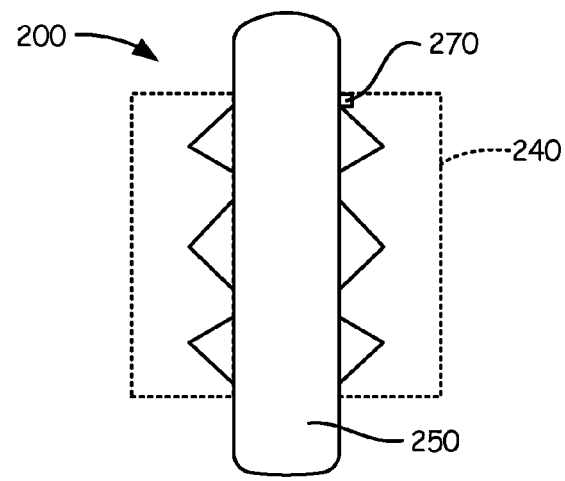

PET LEASH WITH RETRIEVAL TOY

BACKGROUND

The present invention relates generally to a lead or leash for handling domestic animals and, more particularly, to a retractable leash with an incorporated storage compartment.

Typically, pets are required by local law ordinances to be on a leash so as to control the pet and prevent the pet from uncontrollable movement. With this need for pets to be on a leash, advancements have been made to make the leash more functional and user friendly. Various retractable leashes for a pet owner to control the pet are well-known in the art.

Usually, a retractable leash includes a reel around which the line may wind and a mechanism for controlling the extension and retraction of the line. Most retractable leashes in the art feature a retractable coiling system stored in a casing and a handle extending from the casing. Some configurations of the retractable leash may have various compartments attached to the retractable leash casing so as to alleviate the need for the user to carry pet supplies, such as food or water, in his or her hands or a bag.

SUMMARY

A retracting lead assembly includes a casing with an interior surface and an exterior surface and a proximal end and a distal end, the casing having an open space at a center of the distal end; a reel mounted within the casing, the reel having a lead that is on the interior of the casing wrapped at least partially around the reel, the lead having a first end and a second end, the first end attached to the reel, the second end constructed and arranged to attach to an animal; and a handle attached to the exterior surface of the proximal end of the casing.

Another leash assembly includes a housing having an opening therethrough, the housing having an interior surface and an exterior surface; a resilient material attached to a portion of the opening; a retainer mechanism within the housing; and a line with at least a portion stored within the housing and wound around the retainer mechanism, the line having a first end and a second end, the first end attached to the retainer mechanism, the second end extending through an orifice in the exterior surface of the housing, the second end configured to connect to a moveable object.

BRIEF DESCRIPTION OF THE DRAWINGS

FIG. 4 is a distal elevation view of the embodiment of the leash shown in FIG. 1 along with an object being held within the opening.

FIG. 5 is a proximal elevation view of the embodiment of the leash shown in FIG. 1.

FIG. 6 is a top plan view of the embodiment of the leash shown in FIG. 1.

FIG. 7 is a bottom plan view of the embodiment of the leash shown in FIG. 1.

FIG. 8 is a side elevation view of an alternative embodiment of a retractable leash.

FIG. 9 is a distal elevation view of the embodiment of the leash shown in FIG. 8 with an object being held within the opening.

FIG. 10 is a proximal elevation view of the embodiment of the leash shown in FIG. 8.

DETAILED DESCRIPTION

In general, the present invention relates to a retractable leash with the ability to accommodate an object, such as a retrieval toy. The leash is able to be used with a smaller animal, such as a pet dog. The retractable leash includes a casing that is ring shaped with an opening at the center of the distal end of the casing and the ability to firmly hold an object, including a retrieval toy such as a spherical ball. The leash allows the leash user to have the object easily accessible without having to resort to other means to carry the object. Inside the casing of the retractable leash is a length of line or other lead material with one end attached to a mechanism that allows the line to extend and retract. The line extends through an opening in the casing and allows the outer end of the line to attach to an animal. The components of each embodiment of the leash can be manufactured using known methods of plastic molding or similar materials and manufacture, the details of which are apparent to those having skill in the art.

Figure 1:
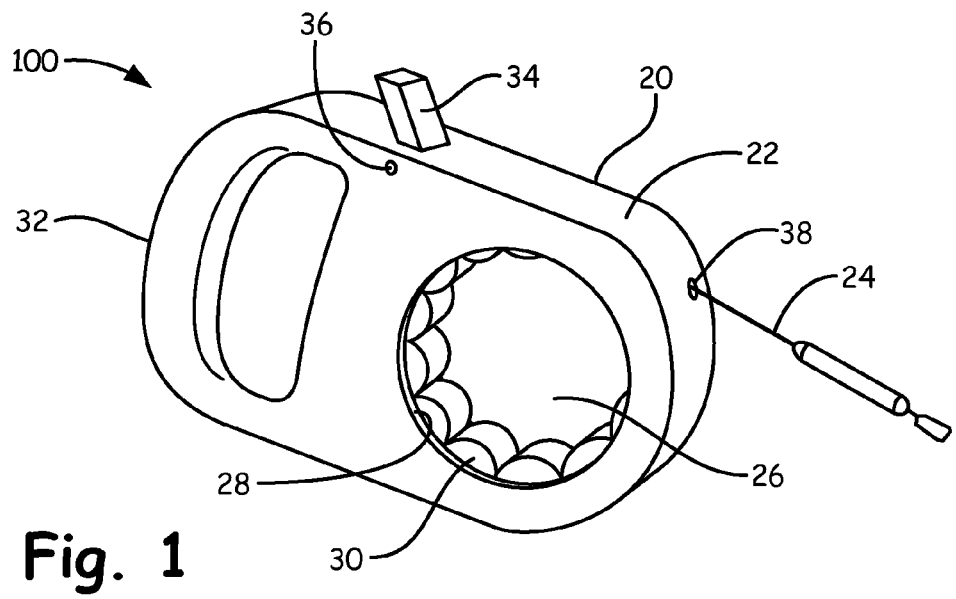
FIG. 1 is a perspective view of a retractable leash with an opening able to accommodate an object.

FIG. 1 is a perspective view of retractable leash 100 according to one embodiment of the leash. Retractable leash 100 includes casing 20 having outer perimeter surface 22, open space 26 in an inner perimeter surface 28, line 24, resilient component 30, handle 32, brake mechanism 34, brake mechanism lock 36, and line opening 38.

Figure 2:
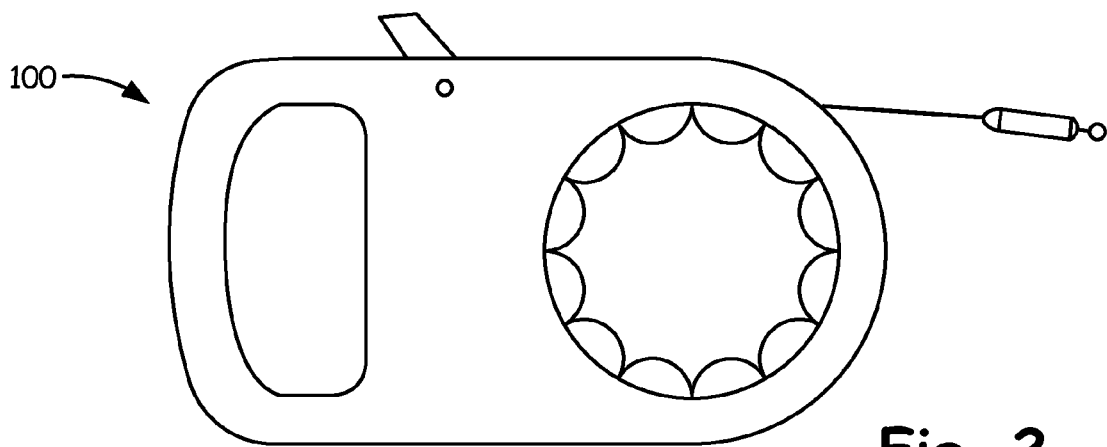
FIG. 2 is a first side elevation view of the embodiment of the leash shown in FIG. 1.
Figure 3:
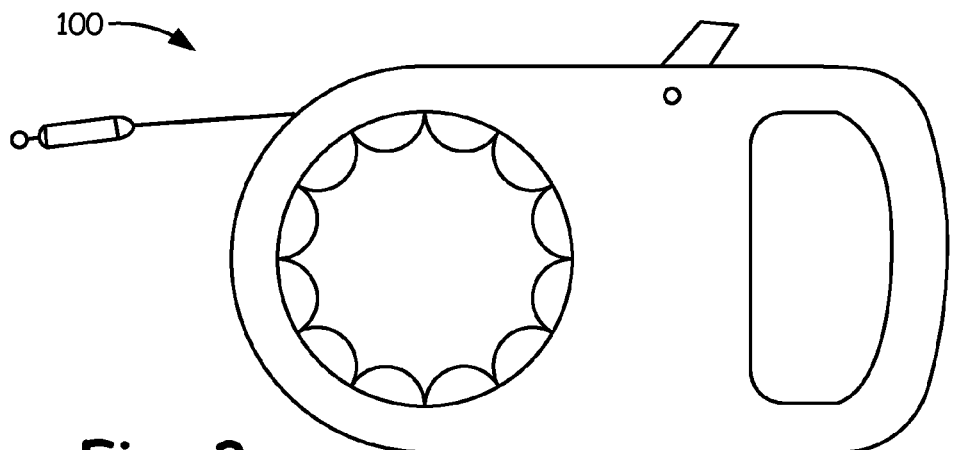
FIG. 3 is a second side elevation view of the embodiment of the leash shown in FIG. 1.

Casing 20 is a housing with outer perimeter surface 22 and inner perimeter surface 28 that provides the main structure component to which all other features are attached to or encompassed within. Casing 20 is rigid and can be made from various materials, such as plastic, fiberglass, or other polymers with similar properties, and by various methods, such as injection molding or similar casting methods. Open space 26 is located at the center of the distal end of casing 20. An object, such as a pet retrieval toy, may be accommodated within open space 26. Attached to inner perimeter surface 28 of casing 20 is resilient component 30, which, in this embodiment, extends completely around inner perimeter surface 28 in a corrugated pattern (seen in FIGS. 2 and 3). While this embodiment shows resilient component 30 extending completely around inner perimeter surface 28, the leash is not limited to such a configuration. Resilient component 30 is configured to firmly hold an object so as to keep it from ejecting from retractable leash 100 during sudden and/or extreme movement.

Housed within casing 20 is line 24 (described in further detail in FIG. 11), which extends through line opening 38. Line opening 38 may be located anywhere on casing 20, but is on the distal end of casing 20 on retractable leash 100. Line 24 is a lead made from a cable of natural or synthetic fibers or a similar rope like structure. Located on the proximal end of casing 20 is handle 32, which may be attached to casing 20 at two points. Brake mechanism 34 is located on the top of casing 20 towards the proximal end, with brake mechanism lock 36 located on the side of casing 20 below brake mechanism 34. Brake mechanism lock 36 extends horizontally through casing 20.

Retractable leash 100 is usually held on the proximal end by handle 32. This allows line 24, which in use is attached to an animal, to extend and retract through line opening 38 at the distal end of casing 20. Brake mechanism 34, most commonly a trigger, and brake mechanism lock 36 are located such that the user can access and operate them with a thumb or other finger. Brake mechanism 34 can be pressed towards casing 20, which prevents line 24 from extending or retracting. Brake mechanism 34 can be held in the "down" position by pressing brake mechanism lock 36 in towards casing 20. Brake mechanism lock 36 extends through casing 20 so that brake mechanism lock 36 can be toggled on or off from each side of casing 20.

Open space 26 at the center of the distal end of casing 20 has the ability to firmly hold an object, such as a pet retrieval toy including a spherical ball, cylindrical chew toy, or similar apparatus, through the use of resilient component 30. Open space 26 has the ability to hold a number of differently shaped and sized objects because of resilient component 30, which may be configured in a corrugated pattern and made of rubber or another similar resilient material. Resilient component 30 allows the user to easily slide an object into open space 26 and remove the object when desired. Resilient component 30 is configured to hold an object so that the object will not be ejected from open space 26 upon sudden and/or extreme movement.

Often, a pet will be required to be on a leash when not within an enclosed space. Once within an enclosed space, such as a dog park, the owner of the pet will detach the pet from the leash and desire to play with or train the pet by utilizing an object, such as a pet retrieval toy. Thus, the two items, a leash and pet retrieval toy, are closely related and often carried by the owner of the pet simultaneously. The above mentioned embodiment allows the retractable leash user to have an object, such as a pet retrieval toy, on hand anytime the retractable leash is present. The disclosed leash allows this without forcing the user to hold the object in his or her hands or find other means, such as a cumbersome bag, to hold the object. The availability of the other hand of the user and the alleviation of the need to carry the object by other means increases the comfort of the user while ensuring the user and pet will have a retrieval toy or other appropriate object available when desired.

FIGS. 4 and 5 are distal and proximal elevation views, respectively, of the embodiment of the leash shown in FIG. 1. Retractable leash 100 includes all of the features present in FIG. 1, along with object 40, which may be a pet retrieval toy such as a ball. FIGS. 4 and 5 show that the object is able to protrude out the sides of casing 20 and handle 32. FIG. 4 also shows line opening 38. While this embodiment shows line opening 38 on the upper portion of casing 20, the leash is not limited to such a configuration.

FIGS. 6 and 7 are top and bottom plan views, respectively, of the embodiment of the leash shown in FIG. 1. Retractable leash 100 includes all of the features present in FIG. 1, along with object 40, which may be a pet retrieval toy such as a ball. FIG. 6 shows the brake mechanism 34 and brake mechanism lock 36, which are located on the upper portion of casing 20. While this embodiment shows brake mechanism 34 and brake mechanism lock 36 located on the upper portion of casing 20, the leash is not limited to such a configuration.

FIG. 8 is a side elevation view of an alternative embodiment of the leash. Retractable leash 200 includes casing 220 having outer perimeter surface 222 of casing 220, open space 226 in inner perimeter surface 228, line 224, resilient component 230, handle 232, brake mechanism 234, brake mechanism lock 236, and line opening 238.

In this alternative embodiment of the leash, resilient component 230 includes resilient flaps attached to inner perimeter surface 228 around open space 226. The resilient flaps can be made from various resilient materials, such as rubber or plastic. These resilient flaps, arranged around open space 226, are in two rows around inner perimeter surface 228 and are flexible enough to allow an object to be contained within the flaps but resilient enough to firmly hold the object by pushing the object towards the open space 226 at the center of the distal end of casing 220. The resilient flaps may also be such things as nodes, strings, or other apparatus.

This alternative embodiment of the leash also includes brake mechanism 234 attached on the inner surface of handle 232. Brake mechanism lock 236 is located on handle 232 and extends through handle 232 so as to be viewable and toggled on or off from each side elevation view of handle 232. Retractable leash 200 also includes line opening 238 on outer perimeter surface 222 located near the bottom portion of the distal end of casing 220, but line opening 238 is not limited to the location in FIG. 8 and can be located anywhere on casing 220.

FIGS. 9 and 10 are distal and proximal elevation views, respectively, of the embodiment of the leash shown in FIG. 8. Retractable leash 200 includes all of the features present in FIG. 8, along with object 240, which may be a pet retrieval toy such as a ball. FIGS. 9 and 10 show the resilient component 230, shown in this embodiment as resilient flaps, firmly holding object 240.

Figure 11:
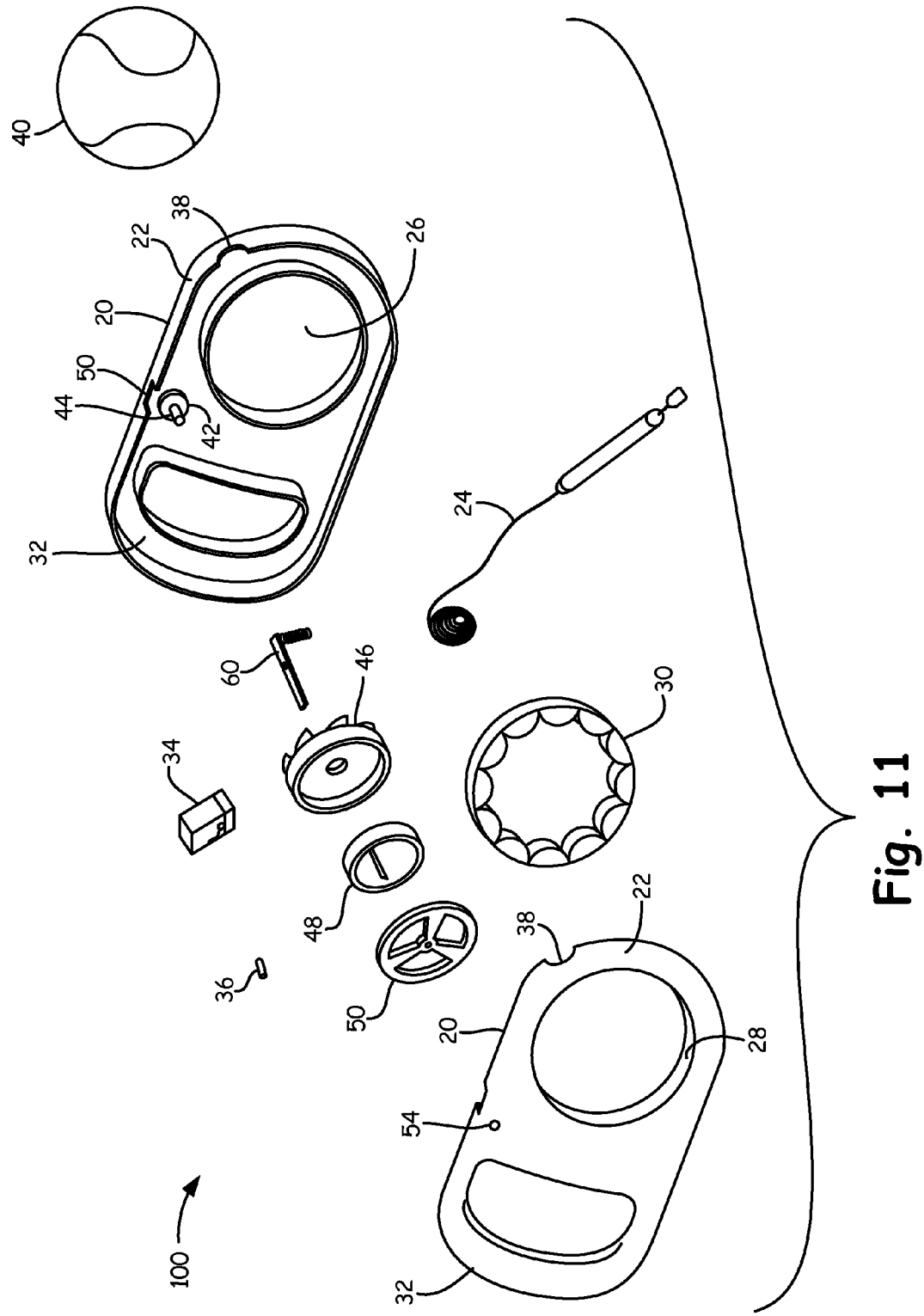
FIG. 11 is an exploded perspective view of the embodiment shown in FIG. 1.

FIG. 11 is an exploded perspective view of the embodiment of the leash shown in FIG. 1. Retractable leash 100 includes casing 20 having outer perimeter surface 22, open space 26 in inner perimeter surface 28, line 24, handle 32, resilient component 30, brake mechanism 34, brake mechanism lock 36, line opening 38, brake mechanism opening 52, and brake mechanism lock opening 54. Within casing 20 are gear housing 42, spring axle 44, spur gear 46, spring 48, spring cover 50, and engaging device 60.

Casing 20 with outer perimeter surface 22 and inner perimeter surface 28 provide the main structural support for retractable leash 100. Most components of retractable leash 100 are attached to or encompassed within casing 20. Attached to the proximal end of casing 20 is handle 32, which is attached to casing 20 at two points on outer perimeter surface 22. Within inner perimeter surface 28 is open space 26, located at the center of the distal end of casing 20. Open space 26 may house object 40 firmly through the use of resilient component 30, which is attached to inner perimeter surface 28. Resilient component 30 may be in a corrugated pattern to allow the user to slide object 40, which may be a pet retrieval toy, into open space 26 and remove object 40 when desired while also holding the object so that the object will not be ejected from open space 26 upon sudden and/or extreme movement. FIG. 11 shows object 40 as a spherical ball, but the object held by this embodiment can be a number of other apparatus.

Attached to the inside of casing 20 is gear housing 42 and spring axle 44, with spring axle 44 located at the center of circular gear housing 42. On spring axle 44 and adjacent to gear housing 42 is spur gear 46. Wrapped around spur gear 46 is line 24, contained within spur gear 46 is spring 48, and attached to spur gear 46 is spring cover 50. Spring 48 is contained within spur gear 46 such that spring 48 is completely enclosed when spring cover 50 is fastened to spur gear 46. Spring cover 50 is attached to spur gear 46 on the side opposite the side in which gear housing 42 and spring axle 44 contact spur gear 46. Brake mechanism 34 is attached to casing 20 and is located within brake mechanism opening 52 in outer perimeter surface 22. Brake mechanism lock 36 is attached to casing 20 and is located within brake mechanism lock opening 54 in outer perimeter surface 22.

Retractable leash 100 is usually held by handle 32 located on the proximal end of casing 20 with line 24 extending out the distal end of casing 20 through line opening 38. Line 24 is a lead made from a cable of natural or synthetic fibers or a similar rope like structure. The end of line 24 that extends away from retractable leash 100 is able to be attached to an animal. Spring 48, housed within spur gear 46 and spring cover 50, is attached to spur gear 46 and spring axle 44 and aids line 24 when retracting into casing 20. When in the retracted position, line 24 is wrapped around spur gear 46. When line 24 is extending out through line opening 38, spur gear 46 will rotate about spring axle 44, causing spring 48 to coil such that spring 48 will resist the extension of line 24 away from retractable leash 100. When less force is applied to the end of line 24 than that stored by spring 48, spring 48 will release its spring energy and line 24 will retract into casing 20 through line opinion 38 and wrap around spur gear 46. While the present embodiment shows spring axle 44 as a cylindrical component with spur gear 46, spring 48, and spring cover 50 located radially outward from spring axle 44, other embodiments of the leash allow a spring axle to be located circumferentially around inner perimeter surface 28 with spur gear 46 and spring 48 circumferentially around the spring axle, as will be explained in FIG. 14.

Resilient component 30, located on inner perimeter surface 28 around open space 26, is configured to hold object 40, which may be a pet retrieval toy, such that object 40 will not be ejected from retractable leash 100 upon sudden and/or extreme movement. Brake mechanism 34, shown in FIG. 11 as a trigger, prevents line 24 from extending or retracting when pressed towards outer perimeter surface 22. When pressed towards outer perimeter surface 22, brake mechanism 34 contacts engaging device 60, forcing engaging device 60 to engage the teeth on spur gear 46 and preventing spur gear 46 from rotating. When spur gear 46 is prevented from rotating by engaging device 60, line 24, which is wrapped around spur gear 46 in the retracted position, is prevented from extending away from or retracting into retractable leash 100. Brake mechanism 34 is located on the top of casing 20 to allow easy access by the user who could use a thumb or other finger to engage brake mechanism 34. Brake mechanism 34 can be held in the "down" position by pressing brake mechanism lock 36 horizontally towards casing 20. Brake mechanism lock 36 extends through casing 20 so that brake mechanism lock 36 can be toggled on or off from each side of casing 20.

As discussed above, the leash shown in FIG. 11 is configured to allow the user of the retractable leash to have an object, including a pet retrieval toy, such as a ball, chew toy, or other apparatus, easily accessible without having to carry the object in the hands of the user or by other means.

Figure 12:
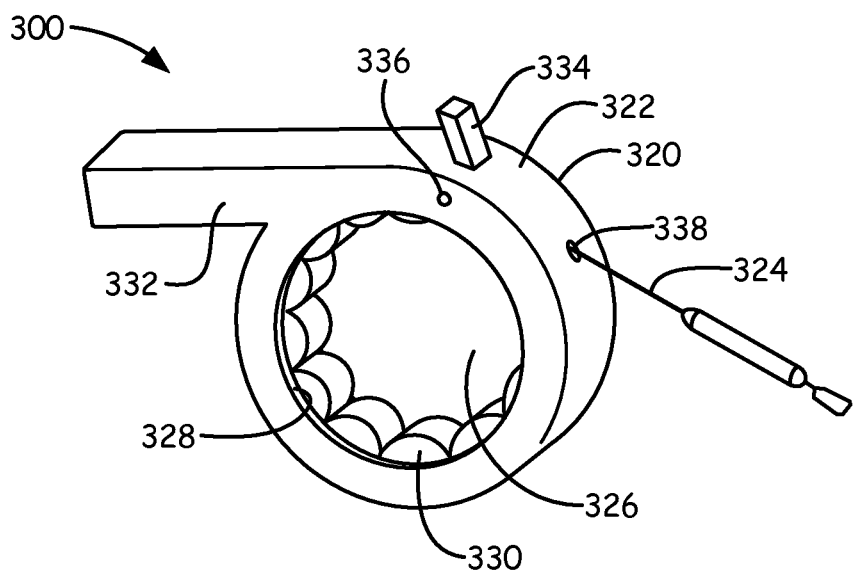
FIG. 12 is a perspective view of an alternate embodiment of a retractable leash.

FIG. 12 is a perspective view of an alternate embodiment of the leash. Retractable leash 300 includes casing 320 having outer perimeter surface 322, open space 326 in inner perimeter surface 328, line 324, resilient component 330, handle 332, brake mechanism 334, brake mechanism lock 336, and line opening 338.

Casing 320 with outer perimeter surface 322 and inner perimeter surface 328 is the main structural component of retractable leash 300, with all components of the embodiment shown in FIG. 12 being attached to or encompassed within casing 320. Casing 320 is rigid and can be made from various materials, such as plastic, fiberglass, or other polymers with similar properties, and by various methods, such as injection molding or similar casting methods. In the middle of casing 320 is open space 326, which is circular and lined by resilient component 330 located on inner perimeter surface 328. Open space 326 and resilient component 330 are configured to be able to firmly hold an object, such as a pet retrieval toy. The object may be a spherical ball, cylindrical toy, or other apparatus. Attached to the proximal end of casing 320 is handle 332, which in this embodiment is attached to casing 320 at one point, but in other embodiments may have a different configuration.

Figure 13:
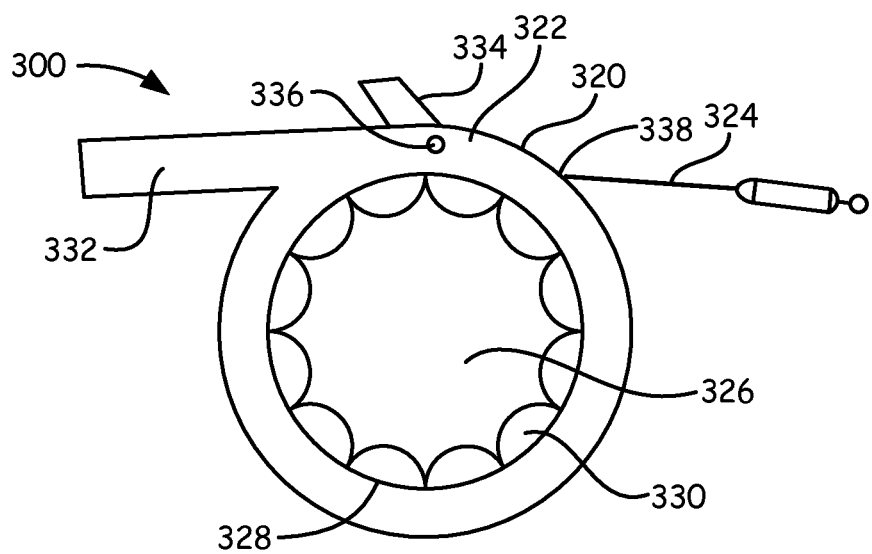
FIG. 13 is a side elevation view of the embodiment of the leash shown in FIG. 12.

In this embodiment, resilient component 330 extends completely around inner perimeter surface 328 (seen in FIG. 13). While this embodiment shows resilient component 330 extending completely around inner perimeter surface 328, the leash is not limited to such a configuration. Resilient component 330, which may be in a corrugated pattern and made of rubber or another similar resilient material, is configured to firmly hold an object, such as a pet retrieval toy, so as to keep the object from ejecting from retractable leash 300 during sudden and/or extreme movement.

Housed within casing 320 is line 324 (described in further detail in FIG. 14), which extends through line opening 338 located on the distal end of casing 320. Line opening 338 is not limited to the location shown in FIG. 12. Line 324 is a lead made from a cable of natural or synthetic fibers or a similar rope like structure. Brake mechanism 334 is located on the top of casing 320 with brake mechanism lock 336 located on the side of casing 320 below brake mechanism 334. Brake mechanism lock 336 extends horizontally through casing 320 so as to be viewable and toggled on or off from each side of casing 320.

The leash embodied by retractable leash 300 is usually held at the proximal end by handle 332, which is opposite the end on which line opening 338 appears. While handle 332 is opposite the end on which line opening 338 appears in this embodiment, the leash is not limited to such configuration. The exterior end of line 324 is then attached to an animal with the interior end of line 324 connected to a component within casing 320 (described in further detail in FIG. 14). This allows the user to control the animal through the use of retractable leash 300. Open space 326 at center of casing 320 is circular, as shown in FIG. 13, and is configured to firmly hold an object, such as a pet retrieval toy, making the object easily accessible. Since an object may be carried in retractable leash 300, the user of the leash is free from having to carry the object either in his or her hands or by other means while still having the object easily accessible.

Figure 14:
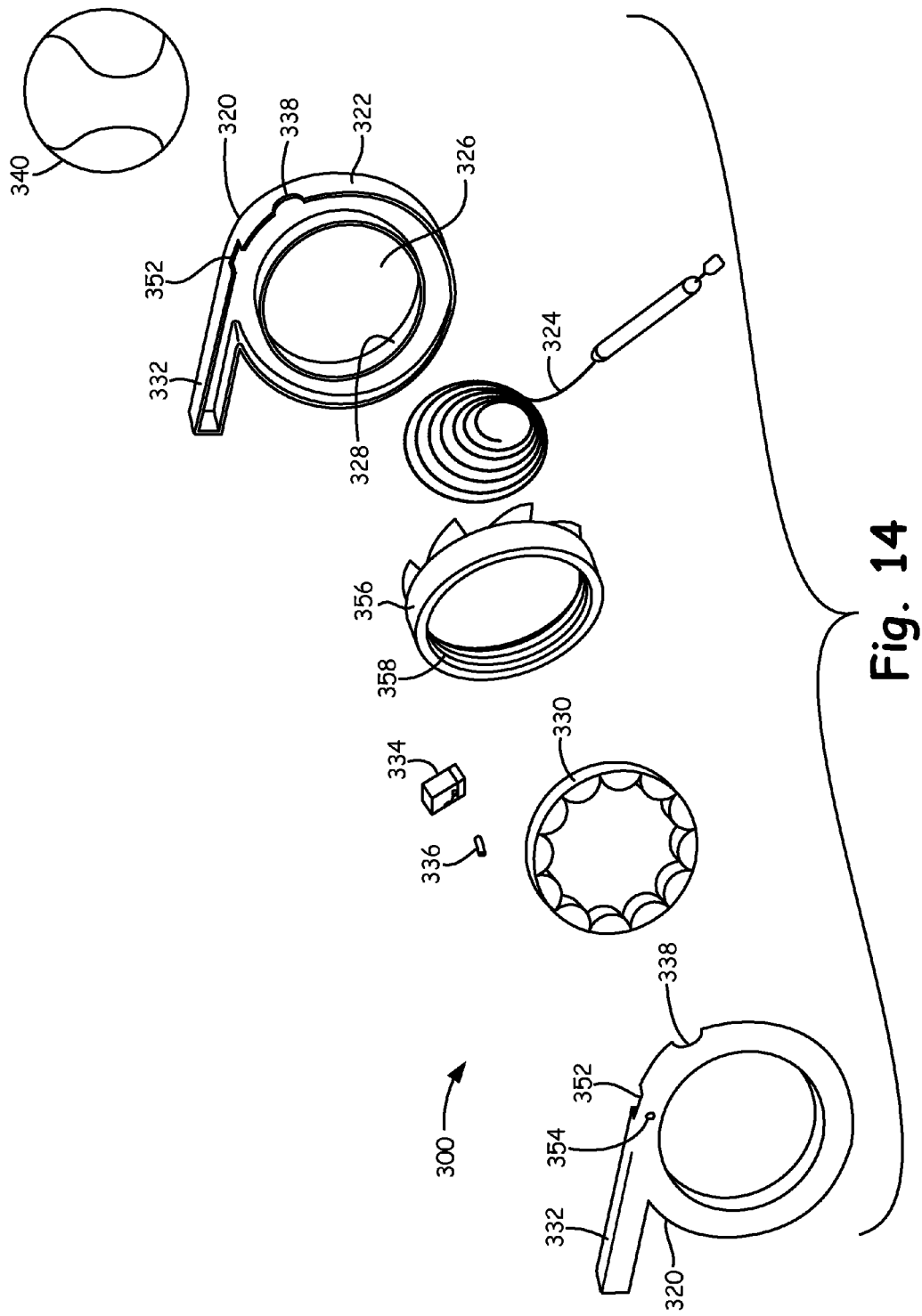
FIG. 14 is an exploded perspective view of the embodiment shown in FIG. 12.

FIG. 14 is an exploded perspective view of the embodiment shown in FIG. 13. Retractable leash 300 includes casing 320 having outer perimeter surface 322 and open space 326 in inner perimeter surface 328. Retractable leash 300 also includes resilient component 330, handle 332, brake mechanism 334, and brake mechanism lock 336. Line opening 338, brake mechanism opening 352, and brake mechanism lock opening 336 are in outer perimeter surface 322. Within casing 320 are spring 356, spur gear 358, and line 324.

Most of the components of retractable leash 300 are attached to or encompassed within casing 320. At the center of casing 320 is open space 326, which is lined by resilient component 330 attached to inner perimeter surface 328. Resilient component 330 may be in a corrugated pattern and is configured to firmly hold object 340, which may be a pet retrieval toy, during sudden and/or extreme movement of retractable leash 300 while also allowing the user to remove object 340 when desired. Resilient component 330 is shown in FIG. 14 as rubber bumpers in a corrugated pattern, but can be any resilient component suited to hold a pet retrieval toy while also allowing such retrieval toy to be easily removed from open space 326. Handle 332 is located on the proximal end of casing 320 and is attached to casing 320 at one point in this embodiment, but the leash is not limited to such a configuration of handle 332.

Located within casing 320 extending circumferentially around ring-shaped inner perimeter surface 328 is spring 356, which is attached to casing 320. Attached to spring 356 on the radially outer side is spur gear 358. Wrapped around spur gear 358, when in the retracted position, is line 324. Line 324 is a lead made from a cable of natural or synthetic fibers or a similar structure. When line 324 is extending away from retractable leash 300 through line opening 338, spur gear 358 rotates, causing spring 356 to coil such that spring 356 will resist the extension of line 324. When less force is applied to the exterior end of line 324 than is stored by spring 356, spring 356 will be allowed to release its spring energy and line 324 will retract into casing 320 and wrap around spur gear 358.

Brake mechanism 334, shown in FIG. 14 as a trigger, prevents line 324 from extending or retracting when pressed towards outer perimeter surface 322. Brake mechanism 334 is located on the top of casing 320 to allow easy access to the user. Brake mechanism 334 can be held in the "down" position by pressing brake mechanism lock 336 horizontally towards outer perimeter surface 322. When pressed towards outer perimeter surface 322, brake mechanism 334 engages the teeth located around spur gear 358, which prevents spur gear 358 from rotating. When spur gear 358 is prevented from rotating by brake mechanism 334, line 324, which is wrapped around spur gear 358 in the retracted position, is prevented from extending away from or retracting into retractable leash 300. Brake mechanism lock 336 extends through casing 320 so that brake mechanism lock 336 can be toggled on or off from each side of casing 320. When released, brake mechanism 334 returns to the "up" position, allowing line 324 to extend and retract freely.

As mentioned above, the present embodiment allows the retractable leash user to have an object, such as a pet retrieval toy, easily accessible anytime the retractable leash is present without forcing the user to hold the object in his or her hands or find other means, such as a cumbersome bag, to hold the object. This, along with the decreased size and convenient shape, increases the comfort of the user while ensuring the availability of a pet retrieval toy.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A retracting lead assembly, comprising:
   a casing with an interior surface and an exterior surface and a proximal end and a distal end, the casing having an open space at a center of the distal end;
   a reel mounted within the casing, the reel having a lead, wherein the lead is on the interior of the casing wrapped at least partially around the reel, the lead having a first end and a second end, the first end attached to extend away from and retract into the casing through an opening in the exterior surface of the distal end of the casing the reel, the second end constructed and arranged to; and
   a handle attached to the exterior surface of the proximal end of the casing.

2. The apparatus of claim 1 wherein the open space at the center of the distal end is configured to hold an object.

3. The apparatus of claim 2 wherein the open space is configured to hold a spherical object.

4. The apparatus of claim 2 wherein the open space contains a resilient component attached to the casing to aid in the holding of an object.

5. The apparatus of claim 1 wherein the casing includes a brake mechanism that prevents the lead from extending or retracting.

6. The apparatus of claim 5 wherein the brake mechanism is controlled by a trigger placed on the exterior surface of the casing.

7. The apparatus of claim 5 wherein the brake mechanism is controlled by a trigger placed on the handle.

8. A leash assembly, comprising:
   a housing with a proximal end and a distal end and an opening at the distal end, the housing having an interior surface and an exterior surface;
   a resilient material attached to a portion of the opening;
   a retainer mechanism within the housing; and
   a line with at least a portion stored within the housing and wound around the retainer mechanism, the line having a first end and a second end, the first end attached to the retainer mechanism, the second end extending through an orifice in the exterior surface of the distal end of the housing, the second end configured to connect to a moveable object.

9. The apparatus of claim 8 wherein the opening in the housing is configured to hold an object.

10. The apparatus of claim 9 wherein the opening is configured to hold a spherical object.

11. The apparatus of claim 8 wherein a handle is attached to or incorporated into the housing.

12. The apparatus of claim 8 wherein the assembly includes a brake mechanism designed to keep the line at a desired length.

13. A lead assembly, comprising:
    a shell with an interior surface and an exterior surface and a proximal end and a distal end, the distal end of the shell having a first opening centrally located at the distal end and a second opening towards the proximal end, the first opening configured to hold an object, the second opening capable of being used as a handle;
    a winding mechanism within the shell; and
    a lead attached to the winding mechanism within the shell, the lead having a first end and a second end, the first end attached to the winding mechanism, the second end configured to attach to a moving object and extend away from the shell when the line is in an extended position, the second end extending away from the shell through an aperture in the exterior surface of the shell.

14. The apparatus of claim 13 wherein the first opening is configured to hold a spherical object.

15. The apparatus of claim 14 wherein the resilient component is at least one corrugated projection lining at least a portion of the first opening.

16. The apparatus of claim 14 wherein the resilient component is a plurality of flaps arranged at least partially around the first opening.

17. The apparatus of claim 13 wherein the open space contains a resilient component attached to the shell to aid in the holding of the object.

18. The apparatus of claim 13 wherein the assembly includes a brake mechanism designed to prevent the lead from moving into or out of the shell.

19. The apparatus of claim 18 wherein the brake mechanism is controlled by a trigger placed on the exterior surface of the shell.

* * * * *